United States Patent [19]

Park

[11] Patent Number: 5,656,890
[45] Date of Patent: Aug. 12, 1997

[54] HIGH-VOLTAGE STABILIZER CIRCUIT FOR A MONITOR

[75] Inventor: Byoung Do Park, Kyungsangbuk-Do, Rep. of Korea

[73] Assignee: LG Electronics, Inc., Seoul, Rep. of Korea

[21] Appl. No.: 512,270

[22] Filed: Aug. 7, 1995

[30] Foreign Application Priority Data

Aug. 10, 1994 [KR] Rep. of Korea .................. U94-20237

[51] Int. Cl.⁶ ........................................... H01J 23/34
[52] U.S. Cl. ........................ 315/1; 315/411; 348/730; 363/97
[58] Field of Search ..................... 315/411, 1; 348/730; 363/21, 97

[56] References Cited

U.S. PATENT DOCUMENTS

| | | | |
|---|---|---|---|
| 5,111,121 | 5/1992 | Gries et al. | 315/411 |
| 5,179,331 | 1/1993 | Sloot | 315/411 |
| 5,276,604 | 1/1994 | Messman | 363/65 |
| 5,377,091 | 12/1994 | Faulk | 363/21 |

*Primary Examiner*—Robert Pascal
*Assistant Examiner*—Justin P. Bettendorf
*Attorney, Agent, or Firm*—Fish & Richardson P.C.

[57] ABSTRACT

A high-voltage stabilizer circuit for a monitor which stabilizes its output voltage by reducing the overshoot of the output voltage occurring when the power is on. According to the circuit, the high voltages induced in two secondary windings of a flyback transformer are superimposed and provided as a reference signal for pulse-width modulation.

3 Claims, 3 Drawing Sheets

HIGH-VOLTAGE STABILIZER CIRCUIT FOR A MONITOR

BACKGROUND OF THE INVENTION

1. Field of the Invention

The present invention relates to a high-voltage stabilizer circuit suitable for use in a monitor. More particularly, the present invention relates to a high-voltage stabilizer circuit for a monitor which stabilizes the output voltage of a high-voltage generating circuit by preventing an abrupt overshoot of the output voltage which may occur when the power is initially turned on.

2. Description of the Prior Art

FIG. 1 is a circuit diagram of a conventional high-voltage generating circuit. The conventional high-voltage circuit is provided with a flyback transformer T1 for generating a high voltage in accordance with a direct current (DC) voltage outputted from an input voltage adjustment section 4, a high-voltage sensing section 1 for sensing the high voltage induced in the secondary winding of the flyback transformer T1 and outputted through a high-voltage generating section 6, an amplifying section 2 for inverse-amplifying the high voltage sensed by the high-voltage sensing section 1, and a pulse-width modulation integrated circuit (PWM IC) 3 for pulse-width modulating the high voltage provided from the amplifying section 2 in accordance with an external horizontal synchronous signal and a voltage fed back from the input voltage adjustment section 4. The conventional high-voltage circuit is also provided with the input voltage adjustment section 4 for controlling the voltage value inputted to the flyback transformer T1 in accordance with a pulse signal provided from the PWM IC 3, and a horizontal output circuit section 5 for providing to the flyback transformer T1 a control voltage for keeping the output voltage of the input voltage adjustment section 4 constant.

The high-voltage sensing section 1 is composed of a resistor R3 for sensing the high voltage induced in the secondary winding of the flyback transformer T1, and a capacitor C2 for smoothing the sensed voltage.

The amplifying section 2 includes an amplifier A1 for amplifying the high voltage sensed by the high-voltage sensing section 1 with a predetermined amplification factor to provide the amplified output signal to the PWM IC 3, and a variable resistor VR1 for variably determining the amplification factor of the amplifier A1.

The input voltage adjustment section 4 includes transistors Q1 and Q2 performing switching operation in accordance with the pulse-width-modulated signal outputted from the PWM IC 3 to provide a switching control signal, and a transistor Q3 which is turned on or off in accordance with the switching control signal to provide a prescribed voltage inputted thereto to the primary winding of the flyback transformer T1 as well as to the PWM IC 3 as a feedback signal.

The horizontal output circuit section 5 comprises a horizontal output transistor Q4 which performs switching operation in accordance with the pulse signal supplied from an external horizontal drive circuit to provide a pulsed voltage to the primary winding of the flyback transformer T1.

The reference numerals L1 to L3 denote coils, R1, R2, R4 to R8 denote resistors, and C1, C3 to C7 denote capacitors. The reference numerals D1 and D2 denote diodes, and ZD1 denotes a Zener diode.

The operation of the conventional high-voltage circuit as constructed above will be described with reference to FIGS. 1 and 2.

When the power of the monitor is on, and a predetermined voltage is supplied to the primary winding of the flyback transformer T1, a high voltage is induced in the secondary winding of the flyback transformer T1.

At this time, the resistor R3 in the high-voltage sensing section 1 senses the high voltage induced in the secondary winding of the flyback transformer T1, and provides a voltage shown as "A" in FIG. 2 to the inverting terminal of the amplifier A1 in the amplifying section 2. The amplifier A1 inverse-amplifies the voltage as shown as "A" in FIG. 2, which is sensed by the resistor R3, smoothed by the capacitor C2, and then inputted to the amplifier A1 through the resistor R4, with an amplification factor determined by the variable resistor VR1, and output the inverse-amplified voltage as shown as "B" in FIG. 2 to the PWM IC 3 through the resistor R6 and the Zener diode ZD1. The inverse-amplified voltage outputted from the amplifier A1 will be used as a reference voltage for the PWM operation of the PWM IC 3.

The PWM IC 3 pulse-width-modulates the voltage outputted from the amplifier A1 as shown as "B" in FIG. 2 in accordance with the external horizontal synchronous signal, and outputs a pulse signal as shown as "C" in FIG. 2 to the transistors Q1 and Q2 in the input voltage adjustment section 4.

The transistor Q3 performs switching operation in accordance with the pulse signal outputted from the transistors Q1 and Q2, and chops the prescribed voltage V1 provided through the coil L1. The transistor Q3 provides the chopped voltage to the primary winding of the flyback transformer T1 through the diode D1 and the capacitor C5, and simultaneously feeds back a saw-tooth voltage as shown as "D" in FIG. 2 to the PWM IC 3 through the resistor R7 and the capacitor C4. The saw-tooth feedback signal is obtained by integrating a square wave signal as shown as "C" in FIG. 2 through the resistor R7 and the capacitor C4.

When the voltage chopped by the switching operation of the transistor Q3 is supplied to the primary winding of the flyback transformer T1, a high voltage is induced in the secondary winding of the flyback transformer T1, and the induced high voltage is inputted to the PWM IC 3 through the high-voltage sensing section 1 and the amplifying section 2. The PWM IC 3 pulse-width-modulates the high voltage outputted from the amplifying section 2 in accordance with the voltage fed back by the transistor Q3 in the input voltage adjustment section 4 and the external horizontal synchronous signal, and provides the pulse-width-modulated voltage to the transistor Q3 through the transistors Q1 and Q2 in the input voltage adjustment section 4, keeping the voltage outputted from the input voltage adjustment section 4 constant. The transistor Q3 performs switching operation in accordance with the pules signal from the PWM IC 3 to keep the voltage inputted to the flyback transformer T1 as shown as "E" in FIG. 2.

At the same time, the horizontal output transistor Q4 in the horizontal output circuit section 5 performs a switching operation in accordance with the horizontal drive signal outputted from the horizontal drive section to provide a predetermined voltage to a horizontal deflection coil.

As described above, the conventional high-voltage generating circuit enables a constant voltage to be induced in the secondary winding of the flyback transformer T1 by sensing the high voltage induced in the secondary winding of the flyback transformer T1 and then by controlling the voltage provided from the input voltage adjustment section 4 to the flyback transformer T1 with the help of the amplification operation of the amplifying section 2 and the control operation of the PWM IC 3.

According to the conventional high-voltage generating circuit, however, the time T1 when the high voltage induced in the secondary winding of the flyback transformer T1 reaches a steady state is lengthened as shown as "A" in FIG. 2 due to the time constant of the internal resistors R1 and R2 and capacitor C1 of the flyback transformer T1, and according to this, the voltage amplified by the amplifying section 2 during the time period has a big overshoot as shown as "B" in FIG. 2

Specifically, the conventional high-voltage circuit has the disadvantages that the initial voltage provided to the flyback transformer T1 through the high-voltage sensing section 1, amplifying section 2, PWM IC 3, and input voltage adjustment section 4 has an abrupt rise, and this causes an excessive voltage to be applied to the horizontal output transistor Q4 in the horizontal output circuit section 5, resulting in overload on the horizontal output transistor Q4.

SUMMARY OF THE INVENTION

The present invention has been made to overcome the problems involved in the prior art. It is an object of the present invention to provide a high-voltage stabilizer circuit for a monitor which stabilizes the high voltage generated in the high-voltage generating circuit by preventing an abrupt rise of the high-voltage output during the initial turn-on of the power, and thus reduces malfunction of the high-voltage generating circuit due to the overshoot generated by the abrupt rise of the high-voltage output.

In order to achieve the above object, there is provided a high-voltage stabilizer circuit for a monitor, comprising:

a transformer having two secondary windings for inducing a high voltage;

input voltage adjustment means for providing a predetermined voltage to a primary winding of said transformer and branching a portion of said voltage;

high-voltage sensing means for sensing said high voltage induced in said second windings of said transformer;

amplifying means for amplifying said sensed voltage provided from said high-voltage sensing means;

pulse-width modulation means for pulse-width-modulating said amplified voltage from said amplifying means in accordance with said voltage branched by said input voltage adjustment means and an input horizontal synchronous signal to provide said pulse-width-modulated voltage to said input voltage adjustment means as its input signal; and horizontal output circuit means for providing a predetermined voltage for the operation of said input voltage adjustment means to said input voltage adjustment means through said primary winding of said transformer.

BRIEF DESCRIPTION OF THE DRAWINGS

The above object and other advantages of the present invention will become more apparent by describing the preferred embodiment thereof with reference to the accompanying drawings, in which.

DETAILED DESCRIPTION OF THE PREFERRED EMBODIMENT

Figure 3:
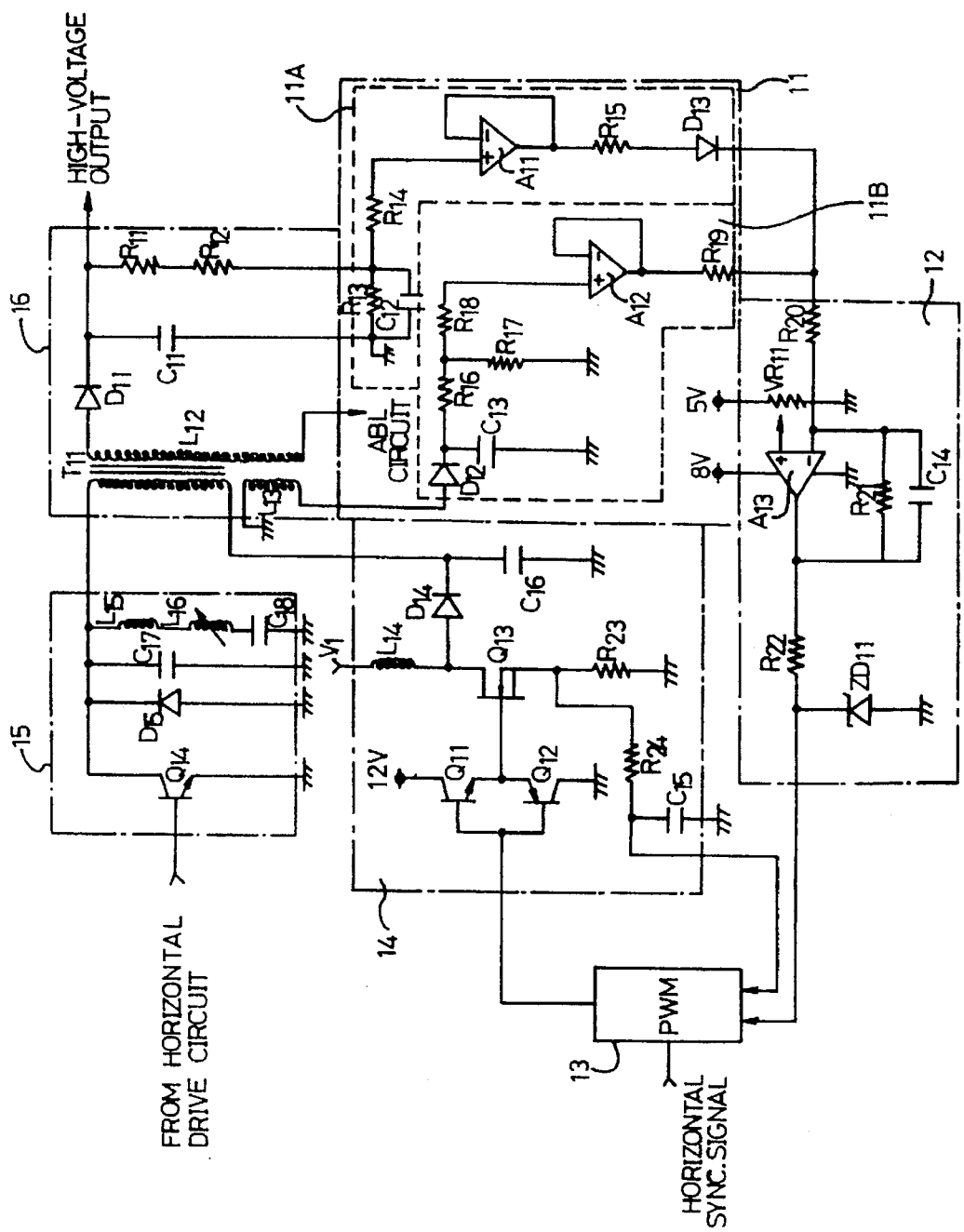
FIG. 3 is a schematic circuit diagram of a high-voltage stabilizer circuit according to the present invention.

FIG. 3 is a circuit diagram of the high-voltage stabilizer circuit for a monitor according to the present invention. Referring to FIG. 3, the high-voltage stabilizer circuit is provided with a flyback transformer T11 for producing a high voltage, a high-voltage sensing section 11 for sensing the high voltage induced in the secondary windings of the flyback transformer T11 and provided through a high-voltage generating section 16, an amplifying section 12 for inverse-amplifying the high voltage sensed by the high-voltage sensing section 11, and a pulse-width modulation (PWM) IC 13 for pulse-width-modulating the amplified high voltage provided from the amplifying section 12 in accordance with an external horizontal synchronous signal and a feed back voltage provided from an input voltage adjustment section 14. The input voltage adjustment section 14 controls the voltage value inputted to the flyback transformer T11 in accordance with a pulse signal provided from the PWM IC 13. A horizontal output circuit section 15 provides to the flyback transformer T11 a control voltage for keeping the output voltage of the input voltage adjustment section 14 constant.

The high-voltage sensing section 11 comprises a first high-voltage sensing section 11A for sensing the high voltage induced in one L12 of the secondary windings of the flyback transformer T11, and a second high-voltage sensing section 11B for sensing the high voltage induced in the other secondary winding L13 of the flyback transformer T11.

The first high-voltage sensing section 11A is composed of a resistor R13 for sensing the high voltage induced in the secondary winding L12, a capacitor C12 for smoothing the sensed high voltage, and an amplifier A11 for amplifying the smoothed high voltage. The second high-voltage sensing section 11B is composed of a diode D12 for sensing and rectifying the high voltage induced in the other secondary winding L13, resisters R16 and R17 for dividing and lowering the rectified high voltage, and an amplifier A12 for amplifying the divided and lowered voltage.

The amplifying section 12 is composed of an amplifier A13 for amplifying the high voltages sensed by the first and second high-voltage sensing sections 11A and 11B with a predetermined amplification factor to provide the amplified voltage to the PWM IC 13, and a variable resistor VR11 for variably determining the amplification factor of the amplifier A13.

The input voltage adjustment section 14 is composed of transistors Q11 and Q12 which perform switching operation in accordance with the pulse-width-modulated signal provided from the PWM IC 13 to provide a switching control signal, and a transistor Q13 which is turned on or off in accordance with the switching control signal to provide a prescribed voltage inputted thereto to the primary winding of the flyback transformer T11 as well as to the PWM IC 13 as the feedback signal.

The horizontal output circuit section 5 comprises a horizontal output transistor Q14 which performs switching operation in accordance with the pules signal supplied from an external horizontal drive circuit to provide a pulsed voltage to the primary winding of the flyback transformer T11.

The reference numerals R11 to R23 denote resistors, C11 to C17 denote capacitors, and D11, D13 and D14 denote diodes. The reference numerals L11 to L16 denote coils, and ZD11 denotes a Zener diode.

The operation of the high-voltage stabilizer circuit according to the present invention as constructed above will be described with reference to FIGS. 3 and 4.

When the power of the monitor is on, and a predetermined voltage is supplied to the primary winding of the flyback transformer T11, a high voltage is induced in the secondary winding of the flyback transformer T11.

Figure 1:
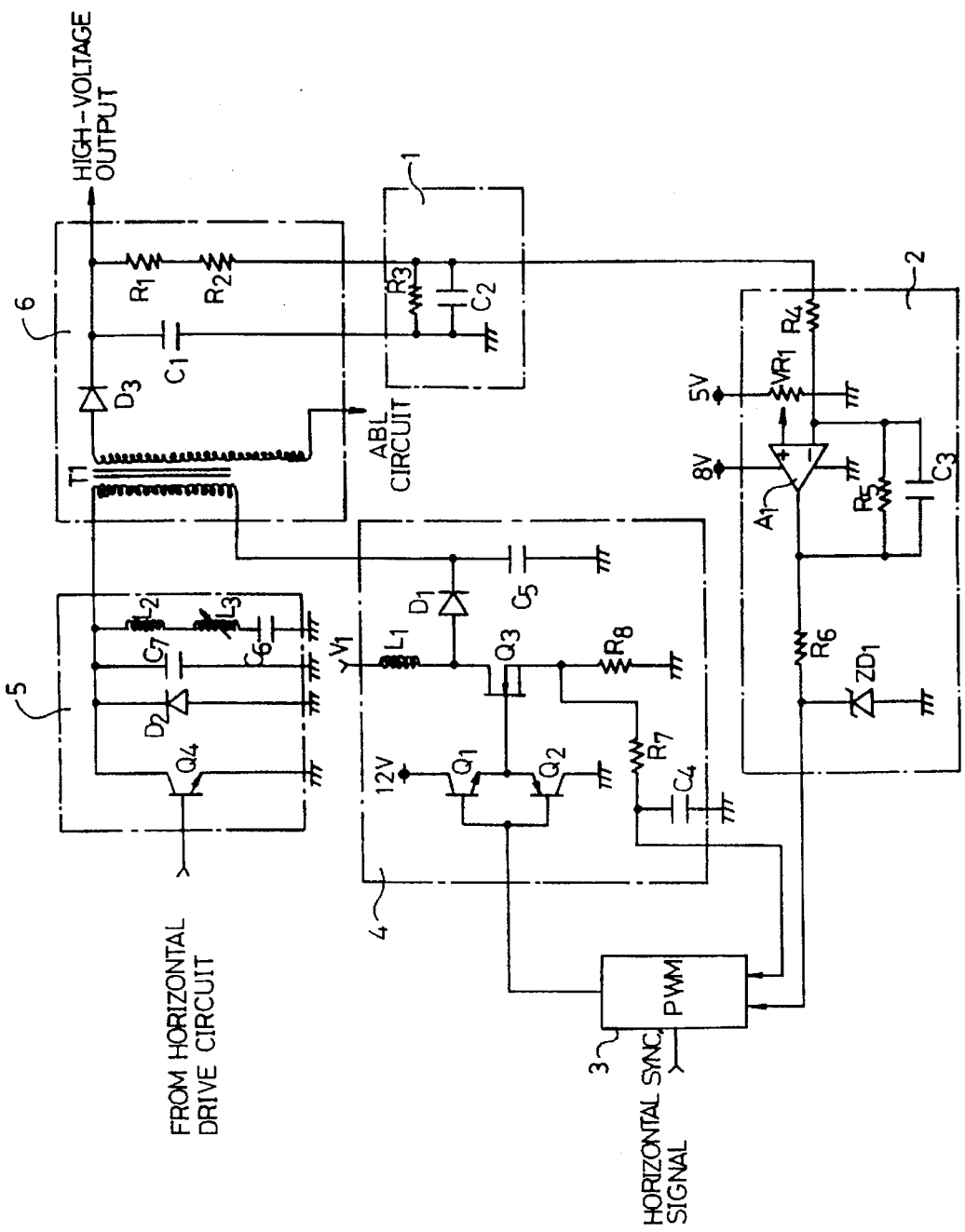
FIG. 1 is a schematic circuit diagram of a conventional high-voltage generating circuit.
Figure 2:
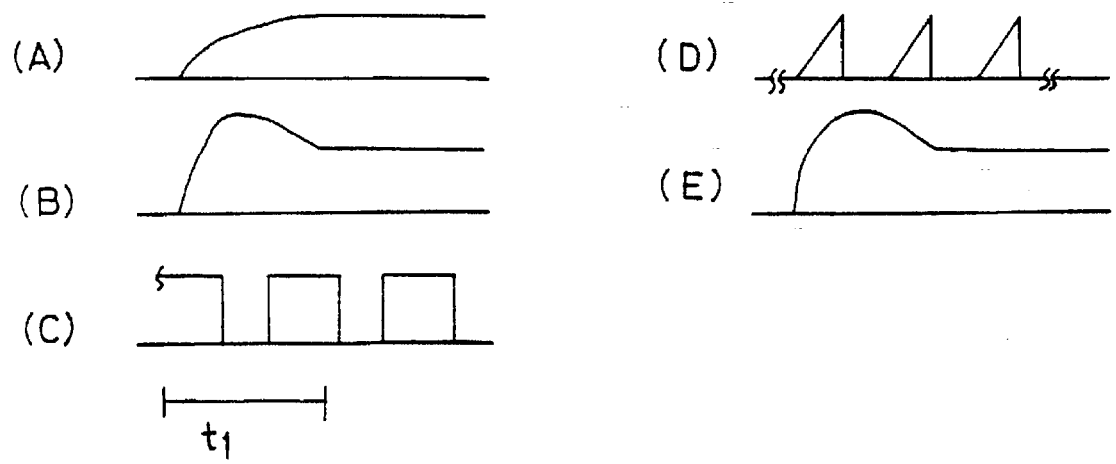
FIGS. 2(A–E) are waveform diagrams showing signal waveforms at various points in the circuit of FIG. 1.
Figure 4:
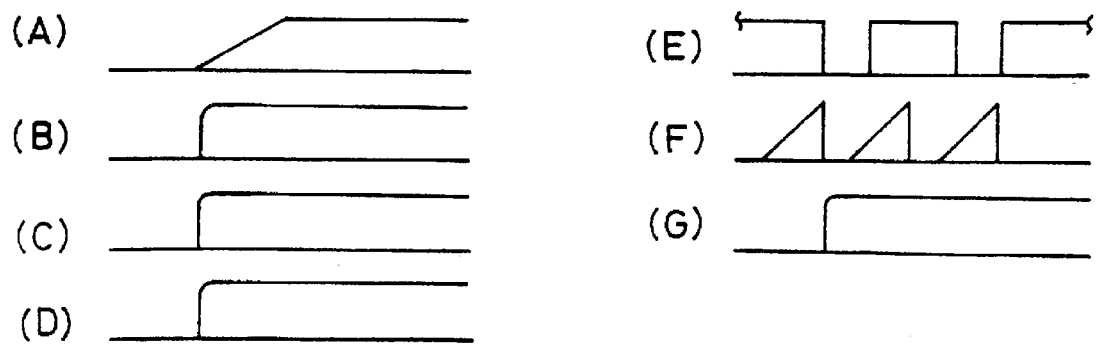
FIGS. 4(A–B) are waveform diagrams showing signal waveforms at various points in the circuit of FIG. 3.

At this time, the resistor R13 in the first high-voltage sensing section 11A senses the high voltage induced in the secondary winding L2 of the flyback transformer T11, and provides a voltage as shown as "A" in FIG. 4 to the amplifier A11. The amplifier A11 amplifies the voltage which is sensed by the resistor R13 and smoothed by the capacitor C12, and then outputs the amplified voltage to the inverting terminal of the amplifier A13 in the amplifying section 12 through the resistor R15 and the diode D13.

On the other hand, the diode D12 in the second high-voltage sensing section 11B rectifies the high-voltage induced in the other secondary winding L13 Of the flyback transformer T11 to provide the rectified voltage as shown as "B" in FIG. 4 to the resisters R16 to R18. The resisters R16 to R18 divides and lowers the rectified voltage outputted from the diode D12 and provides the divided voltage to the amplifier A12. The amplifier A12 amplifies the divided and lowered voltage to provide the amplified voltage to the inverting terminal of the amplifier A13 in the amplifying section 12 through the resistor R19.

As a result, the voltage sensed by the first high-voltage sensing section 11A as shown as "A" in FIG. 4 and the voltage sensed by the second high-voltage sensing section 11B as shown as "B" in FIG. 4 are simultaneously supplied as a superimposed voltage to the inverting terminal of the amplifier A13 as shown as "C" in FIG. 4. The amplifier A13 amplifies the superimposed voltage inputted thereto with an amplification factor determined by the variable resistor VR11, and provides the amplified voltage as shown as "D" in FIG. 4 to the PWM IC 13 through the resistor R22 and the Zener diode ZD11. This amplified voltage will be used as a reference voltage for PWM operation of the PWM IC 13.

The PWM IC 13 pulse-width-modulates the voltage outputted from the amplifier A13 as shown as "D" in FIG. 4 in accordance with the external horizontal synchronous signal, and provides a pulse signal as shown as "E" in FIG. 4 to the transistors Q11 and Q12 in the input voltage adjustment section 14.

The transistor Q13 performs switching operation in accordance with the pulse signal outputted from the transistors Q11 and Q12, and chops the prescribed voltage V11 provided through the coil L14. The transistor Q13 provides the chopped voltage to the primary winding of the flyback transformer T11 through the diode D14 and the capacitor C16, and simultaneously feeds back a saw-tooth voltage as shown as "F" in FIG. 4 to the PWM IC 13 through the resistor R24 and the capacitor C15. The saw-tooth signal is obtained by integrating the square wave signal as shown as "E" in FIG. 4 through the resistor R24 and the capacitor C15.

When the voltage chopped by the switching operation of the transistor Q13 is supplied to the primary winding of the flyback transformer T11, the high voltage is induced in the secondary winding of the flyback transformer T11, and the induced high voltage is inputted to the PWM IC 13 through the high-voltage sensing section 11 and the amplifying section 12. The PWM IC 13 pulse-width-modulates the voltage outputted from the amplifier A13 in the amplifying section 12 in accordance with the voltage fed back by the transistor Q13 in the input voltage adjustment section 14 and the external horizontal synchronous signal, and provides the pulse-width-modulated voltage to the transistor Q13 through the transistors Q11 and Q12 in the input voltage adjustment section 14, keeping the voltage outputted from input voltage adjustment section 14 constant. The transistor Q13 performs switching operation in accordance with the pulse signal outputted from the PWM IC 13 to keep the voltage inputted to the flyback transformer T11 as shown as "G" in FIG. 4.

At the same time, the horizontal output transistor Q14 in the horizontal output circuit section 15 performs a switching operation in accordance with the external horizontal drive section to provide a predetermined voltage to a horizontal deflection coil.

From the foregoing, it will be apparent that the high-voltage stabilizer circuit according to the present invention provides the advantages that it can reduce the initial overshoot of the output voltage by providing two high-voltage sensed by two secondary windings of the flyback transformer to the amplifying section. In the embodiment, one high-voltage sensing signal having a long rise time as shown as "A" in FIG. 4 and the other high-voltage sensing signal having a short rise time as shown as "B" in FIG. 4 are superimposed and provided to the amplifying section.

While the present invention has been described and illustrated herein with reference to the preferred embodiment thereof, it will be understood by those skilled in the art that various changes in form and details may be made therein without departing from the spirit and scope of the invention.

What is claimed is:

1. A high-voltage stabilizer circuit for a monitor, comprising:

a transformer having a primary winding and two secondary windings for producing a high voltage and a low voltage, respectively;

an input voltage adjustment circuit that adjusts an input voltage to said primary winding of said transformer;

a first voltage sensing circuit that senses said high voltage induced in the one of said secondary windings of said transformer;

a second voltage sensing circuit that senses said low voltage induced in the other of said secondary windings of said transformer;

a superimposing and amplifying circuit that superimposes and amplifies said sensed voltages provided from said first and second voltage sensing circuits;

a pulse-width modulator that receives an output voltage of said superimposing and amplifying circuit as its reference signal and provides a pulse-width-modulated signal to said input voltage adjustment circuit; and a horizontal output circuit that provides a predetermined voltage to said input voltage adjustment circuit through said primary winding of said transformer.

2. A high-voltage stabilizer circuit as claimed in claim 1, wherein said first voltage sensing circuit comprises a resistor for sensing said high voltage induced in said secondary windings of said transformer, a capacitor for smoothing said sensed high voltage, and an amplifier for amplifying said smoothed high voltage; and wherein said second voltage sensing circuit comprises a diode for sensing and rectifying said low voltage induced in said secondary windings of said transformer, resistors for lowering said rectified voltage, and an amplifier for amplifying said lowered voltage.

3. A high-voltage stabilizer circuit for a monitor, comprising:

a transformer having two secondary windings for inducing a high voltage;

input voltage adjustment means for providing a predetermined voltage to a primary winding of said transformer and branching a portion of said voltage;

high-voltage sensing means for sensing said high voltage induced in said secondary windings of said transformer, wherein said high-voltage sensing means comprises;

first high-voltage sensing means for sensing said high voltage induced in one of said secondary windings of said transformer, said first high-voltage sensing means comprising a resistor for sensing said high voltage induced in one of said secondary windings of said transformer, a capacitor for smoothing said sensed high voltage, and an amplifier for amplifying said smoothed high voltage; and second high-voltage sensing means for sensing said high voltage induced in the other of said secondary windings of said transformer, said second high-voltage sensing means comprising a diode for sensing and rectifying said high voltage induced in the other of said secondary windings of said transformer, resistors for lowering said rectified voltage, and an amplifier for amplifying said lowered voltage;

amplifying means for superimposing and amplifying said sensed voltages provided from said first and second high-voltage sensing means;

pulse-width modulation means for pulse-width-modulating said amplified and superposed voltage from said amplifying means in accordance with said voltage branched by said input voltage adjustment means and an input horizontal synchronous signal to provide said pulse-width-modulated voltage to said input voltage adjustment means as its input signal; and horizontal output means for providing a predetermined voltage for the operation of said input voltage adjustment means through said primary winding of said transformer.

* * * * *